US012142187B2

(12) United States Patent
Kim et al.

(10) Patent No.: US 12,142,187 B2
(45) Date of Patent: Nov. 12, 2024

(54) IMAGE DISPLAY DEVICE AND OPERATING METHOD THEREFOR

(71) Applicant: LG ELECTRONICS INC., Seoul (KR)

(72) Inventors: Myungwook Kim, Seoul (KR); Hyunseung Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/020,582

(22) PCT Filed: Aug. 11, 2020

(86) PCT No.: PCT/KR2020/010608
§ 371 (c)(1),
(2) Date: Feb. 9, 2023

(87) PCT Pub. No.: WO2022/034939
PCT Pub. Date: Feb. 17, 2022

(65) Prior Publication Data
US 2024/0013700 A1 Jan. 11, 2024

(51) Int. Cl.
*G09G 3/36* (2006.01)
*G09G 3/20* (2006.01)
*G09G 3/34* (2006.01)

(52) U.S. Cl.
CPC ......... *G09G 3/2092* (2013.01); *G09G 3/3406* (2013.01); *G09G 3/36* (2013.01);
(Continued)

(58) Field of Classification Search
CPC ...... G09G 3/2092; G09G 3/3406; G09G 3/36; G09G 2320/0233; G09G 2320/0252;
(Continued)

(56) References Cited

U.S. PATENT DOCUMENTS 10,973,098 B1 * 4/2021 Chen ...................... H05B 47/17
2008/0143729 A1 * 6/2008 Wyatt ...................... G09G 5/18 345/501

(Continued)

FOREIGN PATENT DOCUMENTS

KR 10-2020-0022557 A 3/2020
KR 10-2020-0030853 A 3/2020
KR 10-2020-0081975 A 7/2020

*Primary Examiner* — Jeff Piziali
(74) *Attorney, Agent, or Firm* — Birch, Stewart, Kolasch & Birch, LLP

(57) ABSTRACT

Discussed are an image display device and an operating method therefor. An image display device can include a display panel that includes a plurality of pixels; a backlight unit that irradiates light to the display panel; and a control unit, wherein the control unit may determine a screen refresh rate for an image outputted through the display panel, determine a vertical blanking period for each frame in response to the determined refresh rate, calculate a pixel clock frequency corresponding to the determined vertical blanking period, and control, according to the determined pixel clock frequency, an operation of a plurality of driving elements disposed on the display panel which correspond to the plurality of pixels, respectively.

9 Claims, 10 Drawing Sheets

(52) U.S. Cl.
CPC ............... *G09G 2320/0233* (2013.01); *G09G 2320/0252* (2013.01); *G09G 2340/0435* (2013.01)

(58) Field of Classification Search
CPC ............. G09G 2340/0435; G09G 3/20; G09G 3/3648; G09G 2310/08; G09G 2320/0247; G09G 2320/064; G09G 5/12; G09G 3/3611
See application file for complete search history.

(56) References Cited

U.S. PATENT DOCUMENTS

| | | | | |
|---|---|---|---|---|
| 2016/0275916 | A1 | 9/2016 | Glen et al. | |
| 2019/0005898 | A1* | 1/2019 | Albrecht | G09G 3/3426 |
| 2019/0333456 | A1 | 10/2019 | Lim | |
| 2020/0135149 | A1 | 4/2020 | Lin | |
| 2020/0152148 | A1* | 5/2020 | Chen | G09G 3/3648 |
| 2020/0335062 | A1* | 10/2020 | Huard | G09G 5/18 |
| 2021/0005149 | A1* | 1/2021 | Chen | G09G 3/3406 |
| 2021/0097943 | A1* | 4/2021 | Wyatt | H10K 59/352 |
| 2021/0126017 | A1* | 4/2021 | Furuta | H01L 27/124 |
| 2022/0328015 | A1* | 10/2022 | Sun | G09G 3/3406 |

* cited by examiner

IMAGE DISPLAY DEVICE AND OPERATING METHOD THEREFOR

CROSS REFERENCE TO RELATED APPLICATION

This application is the National Phase of PCT International Application No. PCT/KR2020/010608, filed on Aug. 11, 2020, which is hereby expressly incorporated by reference into the present application.

TECHNICAL FIELD

The following description relates to an image display device and a method of operating the same.

BACKGROUND ART

An image display device is an apparatus having a function to display an image that can be viewed by a user. The user can view broadcasts through the image display device. For example, the image display device may include a Television (TV), monitor, or projector which has a liquid crystal display (LCD) using liquid crystal, or an Organic Light Emitting Diode (OLED) display using OLED, and the like.

The image display device with the LCD includes a display panel including a plurality of pixels, which are arranged in a matrix form, and driving elements, such as thin film transistors (TFTs) which are arranged corresponding to each of the pixels, a backlight unit configured to emit light to the display panel, etc., in which by adjusting the intensity of an electric field formed in the liquid crystal during operation of the driving elements to change a tilt angle of liquid crystal molecules, light is transmitted or blocked to display an image.

However, the liquid crystal display has a problem in that motion blur occurs in an image output through the display panel due to a response speed of the liquid crystal molecules, i.e., a time for the liquid crystal molecules to be vertically or horizontally aligned according to the electric field formed in the liquid crystal. In addition, as the number of frames per second which are output by the image display device increases, it is required to frequently change the electric field for the liquid crystal molecules in proportion to the increase, thereby causing problems in that a more severe afterimage occurs due to a delay in response speed of the liquid crystal molecules, and motion blur also increases.

In the conventional method, in order to improve the motion blur, a pulse width modulation (PWM) dimming method is used, in which the backlight unit is driven using a PWM signal so as to display a black screen between frames in an image. For example, when a refresh rate is 60 Hz, the image display device may set a frequency of the PWM dimming signal to 60 Hz, and by setting a duty ratio of the PWM signal, the image display device may perform control so that the black screen may be displayed between the frames.

However, if the refresh rate further increases, for example, if the refresh rate is set to a high value of 100 Hz or above, luminance difference and gradation unbalance between horizontal lines on the display panel may occur due to different operating times of the driving elements of pixels. That is, while the backlight unit simultaneously emits light to the entire display panel, the driving elements of pixels are sequentially driven in the order of the horizontal lines on the display panel, in which when the refresh rate increases, light is emitted to the display panel before the liquid crystal corresponding to some of the horizontal lines is fully open, thereby causing luminance difference and gradation unbalance between horizontal lines on the display panel.

DISCLOSURE OF INVENTION

Technical Problem

It is an objective of the present disclosure to solve the above and other problems.

It is another objective of the present disclosure to provide an image display device capable of improving motion blur, as well as luminance difference and gradation unbalance between horizontal lines on a display panel, even when a display refresh rate increases.

Technical Solution

In order to achieve the above and other objectives, an image display device according to an embodiment of the present disclosure includes: a display panel including a plurality of pixels; a backlight unit configured to emit light to the display panel; and a controller, wherein the controller is configured to: determine a screen refresh rate for an image output through the display panel; determine a vertical blanking period for each frame in response to the determined refresh rate; calculate a pixel clock frequency corresponding to the determined vertical blanking period; and control operation of a plurality of driving elements based on the calculated pixel clock frequency, the plurality of driving elements arranged corresponding to each of the plurality of pixels and disposed on the display panel.

Meanwhile, a method of operating an image display device according to an embodiment of the present disclosure includes: determining a screen refresh rate for an image; determining a vertical blanking period for each frame in response to the determined refresh rate; calculating a pixel clock frequency corresponding to the determined vertical blanking period; and operating a plurality of driving elements based on the calculated pixel clock frequency, the plurality of driving elements arranged corresponding to each of a plurality of pixels included in a display panel of the image display device, and disposed on the display panel.

Advantageous Effects of Invention

The image display device and a method of operating the same according to the present disclosure have the following effect.

According to various embodiments of the present disclosure, by determining the vertical blanking period and the pixel clock frequency for each of the frames, included in an image, in response to a change in screen refresh rate, it is possible to control operation of the driving elements, arranged corresponding to the pixels of the display panel, before light is emitted to the display panel even when a screen refresh rate of the image display device is set to a high level greater than or equal to a predetermined level, thereby preventing luminance difference and gradation unbalance between the horizontal lines on the display panel.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

MODE FOR THE INVENTION

Figure 1:
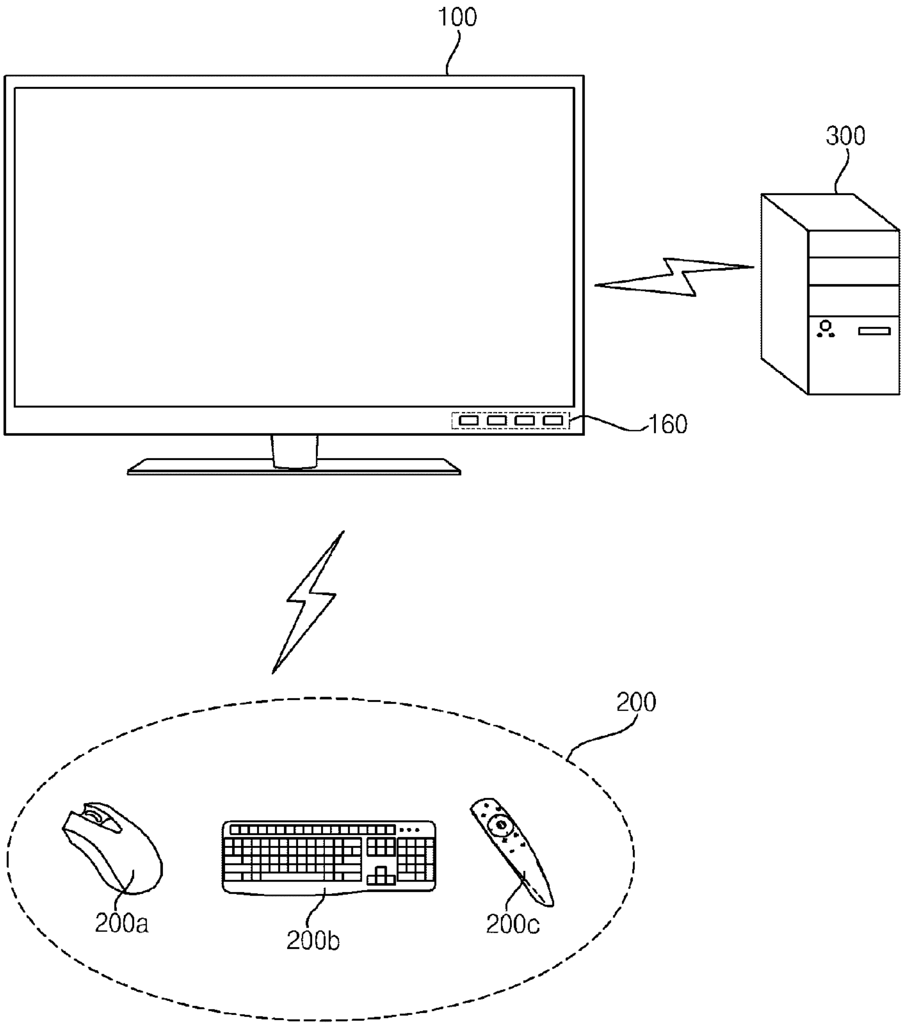
FIG. 1 is a diagram illustrating an image display system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components, and a redundant description thereof will be omitted.

The terms "module" and "unit" for elements used in the following description are given simply in view of the ease of the description, and do not have a distinguishing meaning or role. Therefore, the "module" and "unit" may be used interchangeably.

It should be understood that the terms "comprise", 'include", "have", etc. when used in this specification, specify the presence of stated features, integers, steps, operations, elements, components, or combinations thereof but do not preclude the presence or addition of one or more other features, integers, steps, operations, elements, components, or combinations thereof.

It will be understood that, although the terms first, second, etc., may be used herein to describe various elements, these elements should not be limited by these terms. These terms are only used to distinguish one element from another.

FIG. 1 is a diagram illustrating a system according to various embodiments of the present disclosure.

Referring to FIG. 1, a system 10 includes an image display device 100, a remote controller 200, and/or an image providing device 300.

The image display device 100 may be a device for processing and outputting images. The image display device 100 may be a TV, a notebook computer, a monitor, etc., without particular limitation as long as the image display device may output a screen corresponding to an image signal.

The image display device 100 may receive a broadcast signal and process the received broadcast signal, and may output a signal-processed broadcast image. In the case where the image display device 100 receives the broadcast signal, the image display device 100 may serve as a broadcast receiving device.

The image display device 100 may receive the broadcast signal wirelessly through an antenna or by wire via cables. For example, the image display device 100 may receive a terrestrial broadcast signal, a satellite broadcast signal, a cable broadcast signal, an Internet Protocol TV (IPTV) broadcast signal, and the like.

The remote controller 200 may be connected wirelessly and/or by wire with the image display device 100 to provide various control signals to the image display device 100. In this case, the remote controller 200 may include a device for establishing a wired/wireless network with the image display device 100 and for transmitting various control signals to the image display device 100 or for receiving, from the image display device 100, signals related to various operations processed by the image display device 100, through the established network.

For example, various input devices, such as a mouse 200*a*, a keyboard 200*b*, a pointing device 200*c*, a trackball, a joystick, etc., may be used as the remote controller 200.

The image display device 100 may be connected to only a single remote controller 200 or may be simultaneously connected to two or more remote controllers 200, and may change an object displayed on a screen or adjust a screen state based on control signals provided by the respective remote controllers 200.

Meanwhile, the image display device 100 may output an image received from the image providing device 300. For example, the image display device 100 may store images received from the image providing device 300, and may output the stored images according to a screen size of the image processing device 100, the number of frames displayed per second, and the like.

The image providing device 300 is not particularly limited as long as the image providing device 300, such as a computer, may transmit an image signal including RGB data corresponding to an image.

Figure 2:
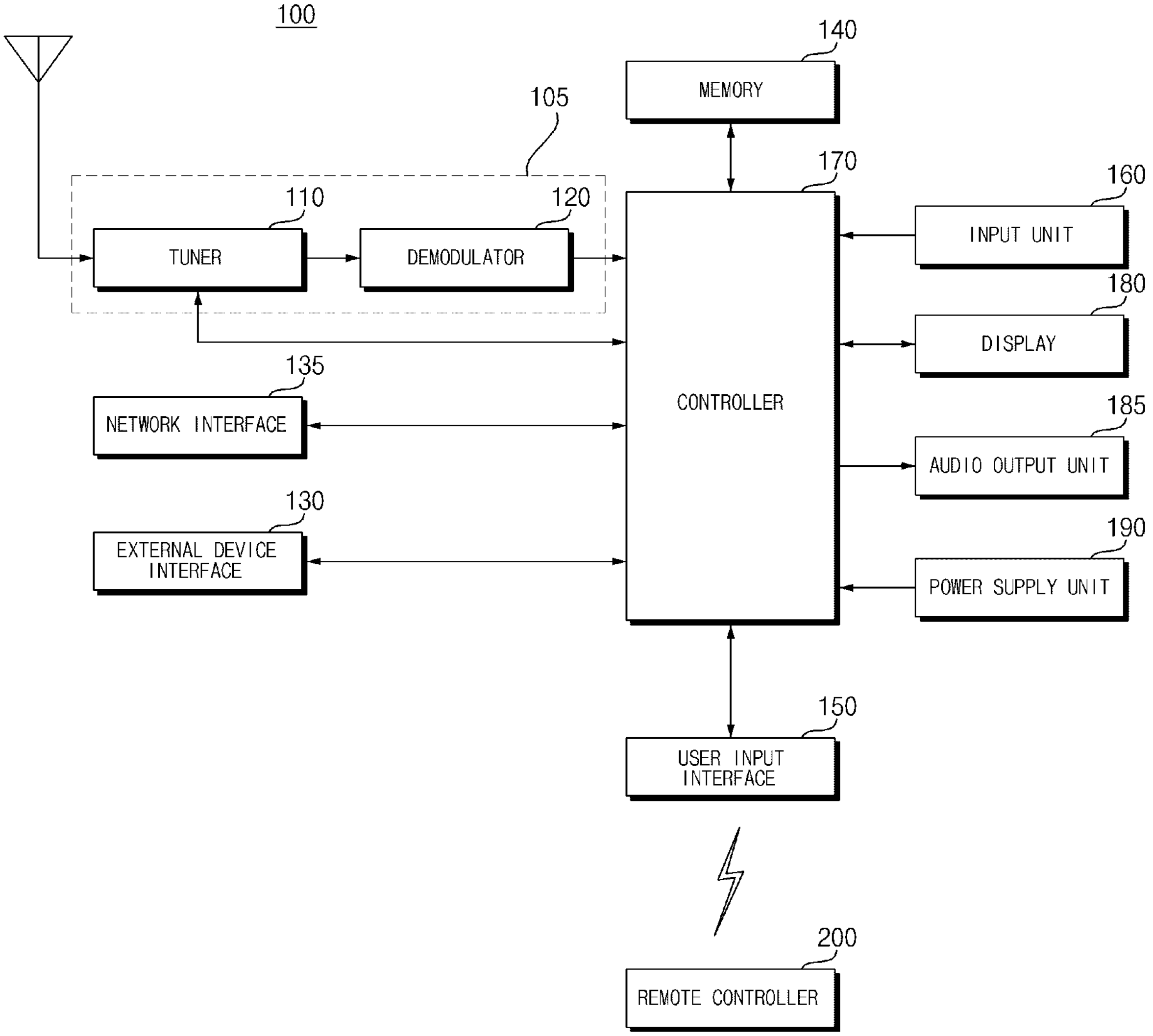
FIG. 2 is an example of an internal block diagram of the image display device of FIG. 1.

FIG. 2 is an internal block diagram of the image display device of FIG. 1.

Referring to FIG. 2, the image display device 100 may include a broadcast receiver 105, an external device interface 130, a network interface 135, a memory 140, a user input interface 150, an input unit 160, a controller 170, a display 180, an audio output unit 185, and/or a power supply unit 190.

The broadcast receiver 105 may include a tuner 110 and a demodulator 120.

Meanwhile, unlike the drawing, the image display device 100 may include only the broadcast receiver 105 and the external device interface 130, among the broadcast receiver 105, the external device interface 130, and the network interface 135. That is, the image display device 100 may not include the network interface 135.

The tuner 110 may select a broadcast signal corresponding to a channel selected by a user or broadcast signals corresponding to all prestored channels from among broadcast signals received via an antenna (not shown) or a cable (not shown). The tuner 110 may convert a selected broadcast signal into an intermediate frequency (IF) signal or a baseband video or audio signal.

For example, if the selected broadcast signal is a digital broadcast signal, the tuner 110 may convert the selected broadcast signal into a digital IF signal (DIF), and if the selected broadcast signal is an analog broadcast signal, the tuner 100 may convert the selected broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

Meanwhile, the tuner 110 may sequentially select broadcast signals of all the broadcast channels stored through a channel memory function from among the received broadcast signals and may convert the selected broadcast signals into intermediate frequency (IF) signals or baseband video or audio signals.

Meanwhile, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device (not shown), e.g., the image providing device 300 illustrated in FIG. 1. To this end, the external device interface 130 may include an A/V input/output unit (not shown).

The external device interface 130 may be connected by wire/wirelessly to external devices, such as a digital versatile disc (DVD) player, a Blu-ray player, a game console, a camera, a camcorder, a computer (laptop), a set-top box, etc., and may perform input/output operations for external devices.

In addition, the external device interface 130 may establish a communication network with various remote controllers 200 as illustrated in FIG. 1, and may receive control signals related to operation of the image display device 100 or may transmit data related to operation of the image display device 100.

The A/V input/output unit may receive video and audio signals of an external device. For example, the A/V input/output unit may include an Ethernet terminal, a USB port, a composite video banking sync (CVBS) terminal, a component terminal, an S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 170. In this case, an analogue signal input through the CVBS terminal and the S-video terminal may be converted into a digital signal by an analogue/digital conversion unit (not shown), to be transmitted to the controller 170.

The external device interface 130 may include a wireless transceiver (not shown) for short-range wireless communication with other electronic devices. The external device interface 130 may exchange data with an adjacent mobile terminal through the wireless transceiver. For example, in a mirroring mode, the external device interface 130 may receive device information, executed application information, application image, and the like from the mobile terminal.

The external device interface 130 may perform short-range wireless communication using Bluetooth, Radio Frequency Identification (RFID), infrared Data Association (IrDA), Ultra-Wideband (UWB), ZigBee, and the like.

The network interface 135 may provide an interface for connecting the image display device 100 to a wired/wireless network including an Internet network.

The network interface 135 may include a communication module (not shown) for communication with the wired/wireless network 400. For example, the network interface 135 may include a communication module for Wireless LAN (WLAN; Wi-Fi), Wireless broadband (Wibro), World Interoperability for Microwave Access (Wimax), High Speed Downlink Packet Access (HSDPA), and the like.

The network interface 135 may transmit or receive data to or from other users or other electronic devices through a connected network or another network linked to the connected network.

The network interface 135 may receive web content or data provided by a content provider or a network operator. That is, the network interface 135 may receive the web content or data, such as movies, advertisements, games, VOD, broadcast signals, etc., as well as information related thereto, which are provided by content providers or network providers through the network.

The network interface 135 may receive update information and an update file of firmware provided by network operators, and may transmit data to internet or content providers or network operators.

The network interface 135 may select a desired application from among a plurality of applications open to the public, and may receive the selected application through a network.

The memory 140 may store programs for processing and controlling each signal within the controller 180, and may store signal-processed video, audio or data signals. For example, the memory 140 may store applications designed to perform various operations which may be processed by the controller 170, and in response to a request from the controller 170, the memory 140 may selectively provide some of the stored applications.

The programs and the like stored in the memory 140 are not particularly limited, as long as the programs may be executed by the controller 170.

The memory 140 may perform the function of temporarily storing video, audio or data signals received from an external device through the external device interface 130.

The memory 140 may store information on predetermined broadcast channels through a channel memory function, such as channel map and the like.

While FIG. 2 illustrates an example in which the memory 140 is provided separately from the controller 170, the scope of the present disclosure is not limited thereto, and the memory 140 may also be included in the controller 170.

The memory 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the memory 140 and the memory may be used interchangeably.

The user input interface 150 may transmit a signal, input by a user, to the controller 170 or may transmit a signal, input from the controller 170, to the user.

For example, the user input interface 150 may transmit/receive a user input signal, such as power on/off, channel selection, screen setup, etc., to/from the remote controller 200, and may transmit a user input signal input through a local key (not shown), such as a power key, a channel key, a volume key, or a setup value, to the controller 170, or may transmit a user input signal, input from a sensor unit (not shown) for sensing a user's gesture, to the controller 170, or may transmit a signal from the controller 170 to the sensor unit.

The input unit 160 may be provided on one side of a main body of the image display device 100. For example, the input unit 160 may include a touchpad, a physical button, and the like.

The input unit 160 may receive various user commands associated with the operation of the image display device 100, and may transmit a control signal corresponding to the input command to the controller 170. For example, the input unit 160 may transmit a control signal, corresponding to a received user command, to the controller 170 through the user input interface 150.

The input unit 160 may include at least one microphone (not shown), and may receive a user's speech through the microphone.

The controller 170 may include at least one processor, and by using the included processor, the controller 170 may control the overall operation of the image display device 100. Here, the processor may be a general processor such as a central processing unit (CPU). Obviously, the processor may be a dedicated device, such as an ASIC, or other hardware-based processor.

The controller 170 may demultiplex the stream signal received from the tuner 110, the demodulator 120, the external device interface 130, or the network interface 135 into a number of signals, or may process the demultiplexed signals to generate and output a signal for image or audio output.

For example, the controller 170 may receive RGB data from the image providing device 300 through the external device interface 130. In this case, the controller 170 may process the RGB data, received from the image providing device 300, to generate a signal for outputting an image, and may transmit the generated signal to the display 180.

The controller 170 may control a plurality of frames, included in an image, to be sequentially output to the display 180 according to a screen refresh rate of an image. Here, the frames may refer to frames of a still image displayed on the display 180, and frames output to the display 180 are sequentially changed according to frames per second (FPS) corresponding to the screen refresh rate, thereby allowing a user to view a video. For example, if the screen refresh rate is 60 Hz, the controller 170 may perform control to output 60 frames per second to the display 180.

Although not illustrated in FIG. 2, the controller 170 may include a demultiplexer, an image processor, and the like, which will be described later with reference to FIG. 3.

The display 180 may convert a video signal, a data signal, an OSD signal, and a control signal processed by the controller 170 or a video signal, a data signal and a control signal received from the external device interface 130 to generate driving signals, which will be described later with reference to FIG. 4.

Meanwhile, the display 180 may be configured as a touchscreen to be used as an input device in addition to an output device.

The audio output unit 185 may receive an audio signal processed by the controller 170, and outputs the audio signal as sound.

The image signal, processed by the controller 170, may be input to the display 180 to be displayed as an image corresponding to the image signal. Further, the image signal processed by the controller 170 may be input to an external output device through the external device interface 130.

The audio signal processed by the controller 170 may be output as sound to the audio output unit 185. Further, the audio signal processed by the controller 170 may be input to an external output device through the external device interface 130.

Besides, the controller 170 may control the overall operation of the image display device 100. For example, the controller 170 may control the tuner 110 to tune in to a broadcast channel selected by a user or a prestored channel.

In addition, the controller 170 may control the image display device 100 according to a user command input through the user input interface 150 or an internal program.

Meanwhile, the controller 170 may control the display 180 to display images. Here, the images displayed on the display 180 may be still images or moving images and may be 2D images or 3D images.

Meanwhile, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a moving image, and text.

Meanwhile, the image display device 100 may further include an image capturing unit (not shown). The image capturing unit may capture images of a user. The image capturing unit may be implemented with one camera, but is not limited thereto, and may be implemented with a plurality of cameras. Further, the image capturing unit may be embedded in the image display device 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image display device 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image display device 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote controller 200 transmits a user input to the user input interface 150. To this end, the remote controller 200 may use Bluetooth, radio frequency (RF) communication, infrared (IR) communication, Ultra Wideband (UWB), ZigBee, and the like. Furthermore, the remote controller 200 may receive video, audio or data signals output from the user input interface 150, and may display the received signals or output the same as sound through the remote controller 200.

Meanwhile, the aforementioned image display device 100 may be a fixed type or movable digital broadcast receiver capable of receiving digital broadcast.

Meanwhile, the block diagram of the image display device 100 illustrated in FIG. 2 is merely a block diagram for an embodiment of the present disclosure. Components of the block diagram may be integrated, added or omitted according to specifications of the actually implemented image display device 100.

That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
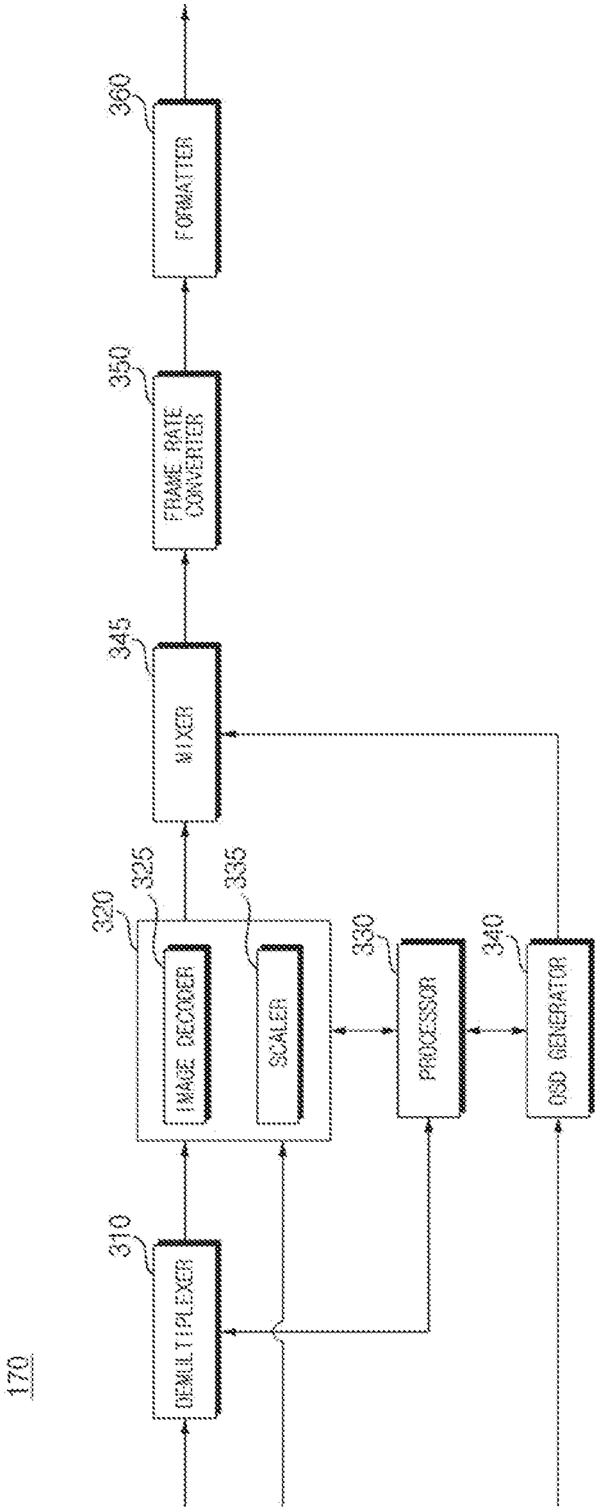
FIG. 3 is an example of an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. Besides, the controller 170 may further include an audio processor (not shown) and a data processor (not shown).

The demultiplexer 310 demultiplexes the input stream. For example, when an MPEG-2 TS is input, the demultiplexer 310 may demultiplex the MPEG-2 TS into video, audio, and data signals, respectively. Here, the stream signal input to the demultiplexer 310 may be a stream signal output from the tuner unit 110, the demodulator 120, or the external device interface 130.

The image processor 320 may perform image processing on the demultiplexed video signal. To this end, the image processor 320 may include an image decoder 325 and a scaler 335.

The image decoder 325 decodes the demultiplexed video signal, and the scaler 335 performs scaling so that the resolution of the decoded video signal may be output to the display 180.

The image decoder 325 may include a decoder of various standards. For example, a 3D image decoder for MPEG-2, H.264 decoder, a color image, and a depth image, and a decoder for a multiple view image may be provided.

The processor 330 may control the overall operation of the image processing device 100 or the controller 170. For example, the processor 330 may control the tuner 110 to tune in to an RF broadcast channel selected by a user or a prestored channel.

In addition, the processor 330 may control the image processing device 100 by a user command input through the user input interface 150 or an internal program.

Further, the processor 330 may control data transmission with the network interface 135 or the external device interface 130.

Moreover, the processor 330 may control operations of the demultiplexer 310, the image processor 320, the OSD generator 340, and the like in the controller 170.

The OSD generator 340 generates an OSD signal according to a user input or by itself. For example, based on a user input signal input through the input unit 160, the OSD generator 340 may generate a signal for displaying a variety of information as a graphic or a text on the screen of the display 180.

The generated OSD signal may include various data such as a user interface screen of the image processing device 100, various menu screens, a widget, and an icon. In addition, the generated OSD signal may include a 2D object or a 3D object.

In addition, the OSD generator 340 may generate a pointer that may be displayed on the display, based on a pointing signal input from the remote controller 200.

The OSD generator 340 may include a pointing signal processing unit (not shown) for generating a pointer. The pointing signal processing unit (not shown) may be provided separately, rather than being provided in the OSD generator 240.

The mixer 345 may mix an OSD signal generated by the OSD generator 340 with a decoded image signal image-processed by the image processor 320. The mixed image signal may be supplied to the frame rate converter 350.

The frame rate converter (FRC) 350 may convert the frame rate of an input image. Meanwhile, the frame rate converter 350 may also directly output the frame rate without any additional frame rate conversion.

The formatter 360 may arrange a left-eye video frame and a right-eye video frame of the 3D video signal subjected to frame rate conversion. Further, a synchronization signal Vsync may be output for opening the left-eye glass and the right-eye glass of the 3D viewing device (not shown).

Meanwhile, the formatter 360 may convert the format of an input image signal into an image signal to be displayed and output on the display 180.

In addition, the formatter 360 may change the format of a 3D image signal. For example, the formatter 360 may change the format of the 3D image signal into any one of various 3D formats such as a side by side format, a top/down format, a frame sequential format, an interlaced format, a checker box format, and the like.

Meanwhile, the formatter 360 may convert a 2D video signal into a 3D video signal. For example, the formatter 360 may detect an edge or a selectable object from the 2D video signal and separate an object according to the detected edge or the selectable object as a 3D video signal to thereby generate the 3D video signal according to a 3D video generation algorithm. In this case, the generated 3D video signal may be separated into a left-eye video signal L and a right-eye video signal R and aligned as described above.

Meanwhile, although not illustrated herein, a 3D processor (not shown) for 3-dimensional (3D) effect signal processing may be further provided following the formatter 360. Such a 3D processor (not shown) may control brightness, tint and color of a video signal for 3D effect enhancement. For example, the 3D processor (not shown) may perform signal processing for making a close-range view clear and blurring a distant view. The function of the 3D processor may be integrated with the formatter 360 or the image processor 320.

Meanwhile, the audio processor (not shown) included in the controller 170 may process a demultiplexed audio signal. To this end, the audio processor (not shown) may include various decoders.

In addition, the audio processor (not shown) included in the controller 170 may control base, treble, volume, and the like.

The data processor (not shown) included in the controller 170 may process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast through each channel.

Meanwhile, the block diagram of the controller 170 illustrated in FIG. 3 is merely a block diagram for an embodiment of the present disclosure, and components of the block diagram may be integrated, added, or omitted according to the specifications of the actually implemented controller 170.

Particularly, each of the frame rate converter 350 and the formatter 360 may be separately provided instead of being included in the controller 170, or may be provided separately as one module.

Figure 4:
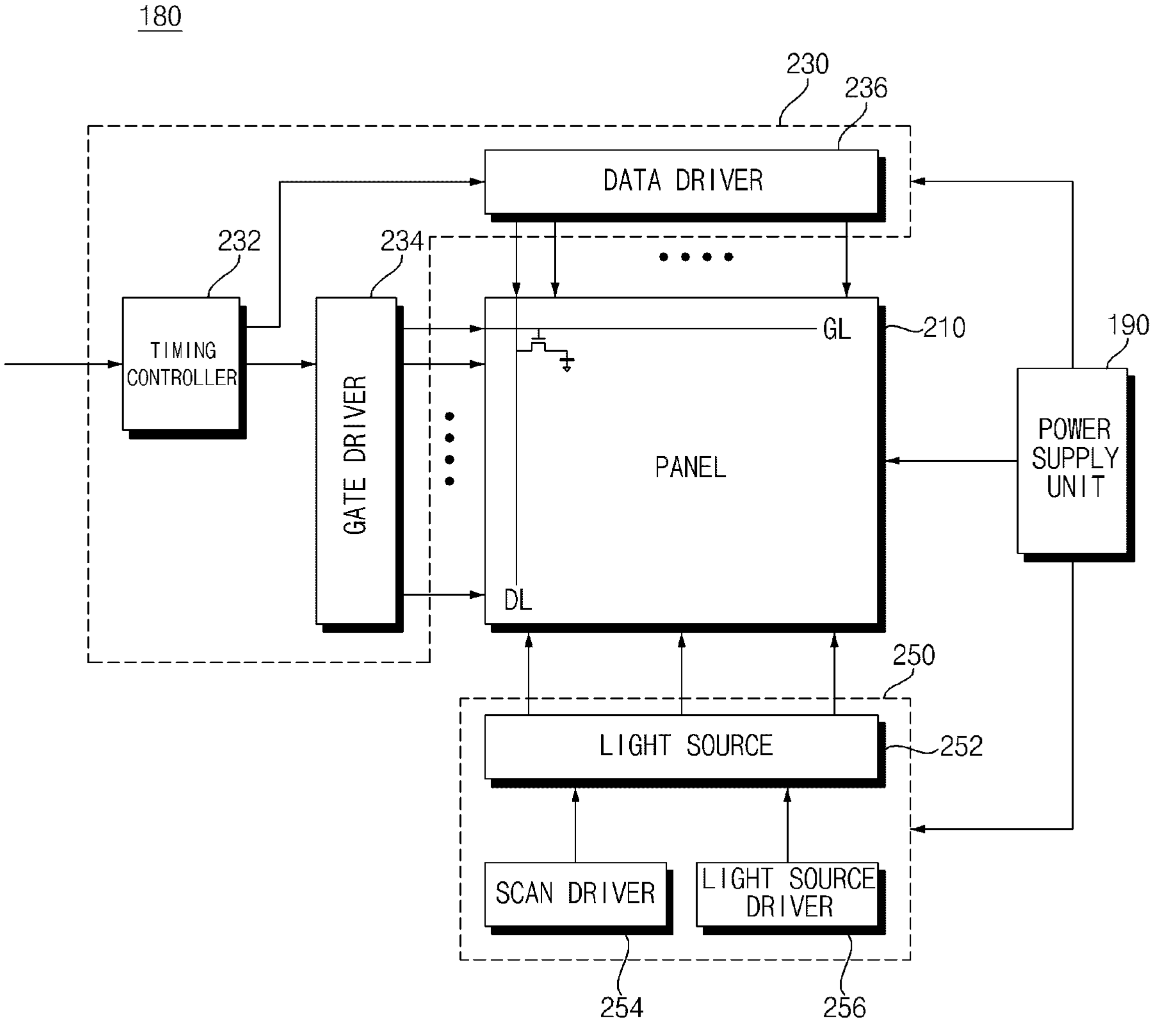
FIG. 4 is an example of an internal block diagram of a display of FIG. 2.

FIG. 4 is an example of an internal block diagram of the display of FIG. 2.

Referring to FIG. 4, the display 180 may include a display panel 210, a driving circuit unit 230, and/or a backlight unit 250.

In order to display an image, the display panel 210 may include: a first substrate on which a plurality of gate lines GL and data lines DL intersect with each other to form a matrix, and driving elements, such as thin film transistors, and pixel electrodes connected thereto are arranged at intersections of the gate lines and the data lines; a second substrate having a common electrode; and a liquid crystal layer formed between the first substrate and the second substrate.

The driving circuit unit 230 drives the display panel 210 using a control signal and a data signal supplied from the controller 170 of FIG. 2. To this end, the driving circuit unit 230 may include a timing controller 232, a gate driver 234, and a data driver 236.

The timing controller 232 receives a control signal, R, G, and B data signals, a vertical synchronization signal Vsync, and the like from the controller 170 to control the gate driver 234 and the data driver 236 in response to the control signal, and rearranges the R, G, and B data signals to provide the same to the data driver 236.

Under the control of the gate driver 234, the data driver 236, and the timing controller 232, a scan signal and an image signal are supplied to the display panel 210 through the gate lines GL and the data lines DL.

The backlight unit 250 may supply light to the display panel 210. To this end, the backlight unit 250 may include a light source 252, a scan driver 254 for controlling scan driving of the light source 252, and a light source driver 256 for turning on/off the light source 252.

The light source driver 256 may generate an analog dimming signal and/or a PWM dimming signal in response to a control signal received from the controller 170, and may drive the light source 252 by using the generated signal. An analog dimming method controls brightness of the light source 252 by adjusting an amount of current supplied to the light source 252, and a PWM dimming method controls brightness of the light source 252 by adjusting an on/off time ratio of the light source 252 in response to the PWM signal.

The display 180 may display a predetermined image by using light output from the backlight unit 250, when light transmittance of the liquid crystal layer is adjusted by an electric field formed between the pixel electrodes and the common electrode of the display panel 210.

Meanwhile, in the case where the display 180 includes an organic light-emitting panel which is a self-light-emitting panel, the backlight unit 250 illustrated in the drawing may be omitted.

The power supply unit 190 may supply a voltage to the respective electrodes of the display panel 210, and may supply a voltage to each of the data driver 236 and the gate driver 234.

Meanwhile, the power supply unit 190 may supply driving power for driving the light source 252 of the backlight unit 250.

Figure 5:
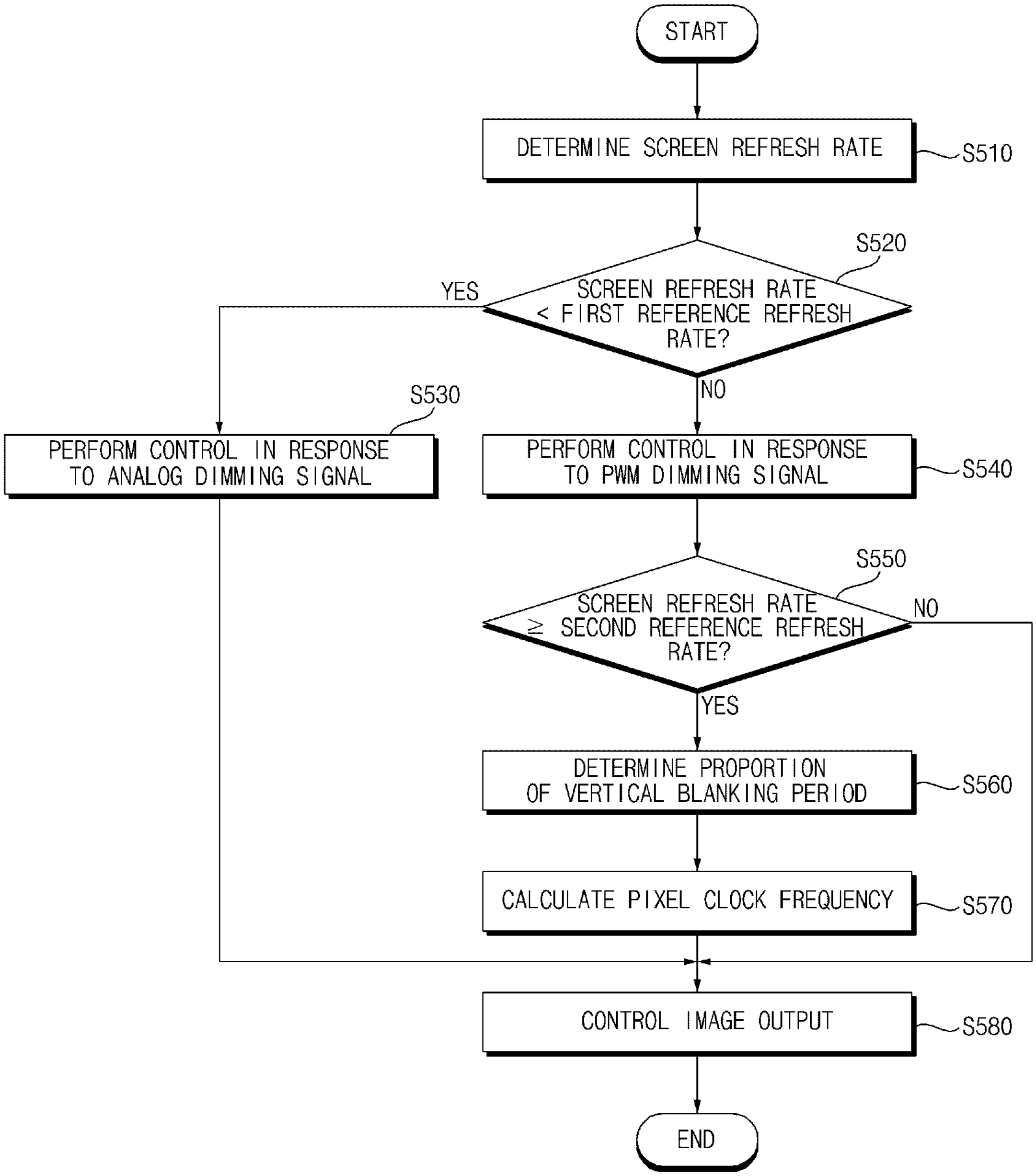
FIG. 5 is a flowchart illustrating a method of operating an image display device according to an embodiment of the present disclosure.

FIG. 5 is a flowchart illustrating a method of operating an image display device according to an embodiment of the present disclosure, and FIGS. 6 to 9 are diagrams referred to in the description of a method of operating an image display device.

Referring to FIG. 5, in operation S510, the image display device 100 may determine a screen refresh rate for an image output through the display panel 210. For example, the image display device 100 may determine the screen refresh rate based on a user input received through the user input interface 150, or the type of image to be output.

Figure 6:
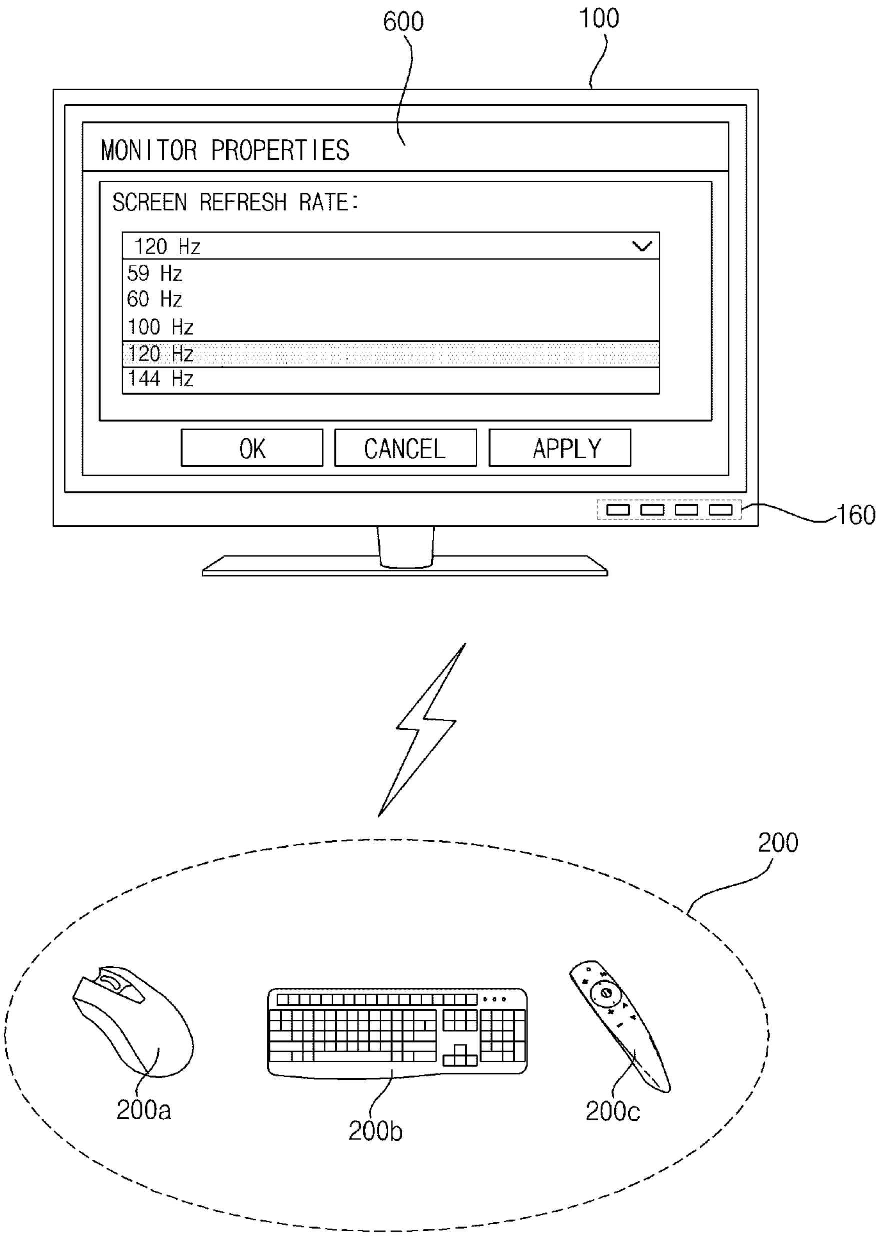
FIGS. 6 to 9B are diagrams referred to in the description of a method of operating an image display device.

Referring to FIG. 6, while a settings screen 600 is output to the display 180, a user may select any one of a plurality of screen refresh rates through the input unit 160 or the remote controller 200, and the image display device 100 may determine, as a screen refresh rate for an image, the selected screen refresh rate based on the user input received through the user input interface 150.

Referring back to FIG. 5, in operation S520, the image display device 100 may check whether the screen refresh rate is lower than a predetermined first reference refresh rate. Here, the first reference refresh rate may be a maximum value (e.g., 50 Hz) in a range of low screen refresh rates in which the occurrence of motion blur is not considered.

If the screen refresh rate is lower than the first reference refresh rate, the image display device 100 may display an image on the display 180 by driving the light source 252 in response to an analog dimming signal in operation S530.

Meanwhile, if the screen refresh rate is higher than or equal to the first reference refresh rate, the image display device 100 may determine to drive the light source 252 in response to a PWM dimming signal in operation S540.

In operation S550, the image display device 10 may check whether the screen refresh rate is higher than or equal to a predetermined second reference refresh rate. Here, the second reference refresh rate may be a minimum value (e.g., 100 Hz) in a range of screen refresh rates in which luminance difference and gradation unbalance at or above a predetermined level may occur between horizontal lines on the display panel 210 due to different operating times of the driving elements arranged on the display panel 210.

If the screen refresh rate is higher than or equal to the second reference refresh rate, the image display device 100 may determine a proportion of a vertical blanking period according to the screen refresh rate in operation S560.

In operation S570, the image display device 100 may calculate a pixel clock frequency corresponding to the vertical blanking period.

Meanwhile, if the screen refresh rate is higher than or equal to the first reference refresh rate and is lower than the second reference refresh rate, the image display device 100 may determine the vertical blanking period and the pixel clock frequency according to a predetermined setting.

The above method will be described below with reference to FIGS. 7 to 8B.

Figure 7:
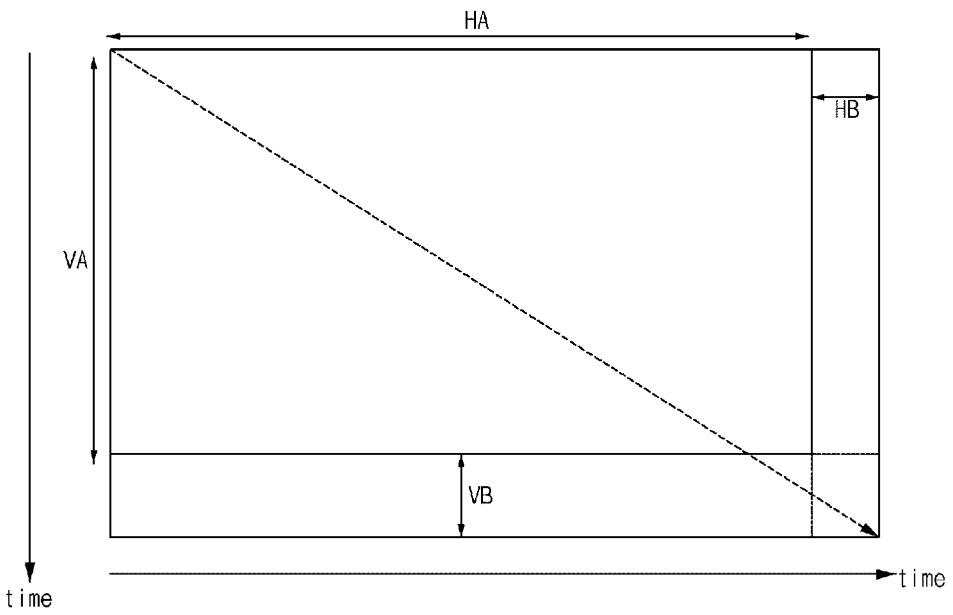

FIG. 7 is a diagram illustrating an example of a display period of an image signal for a frame by using concept of a temporal axis.

Referring to FIG. 7, a horizontal active period HA may refer to the number of pixel data displayed on one of the horizontal lines of the display panel 210.

A horizontal blanking period HB may refer to a value obtained by converting a period, in which no pixel data is displayed, between the horizontal active periods HA, included in each of adjacent frames, into the number of pixels.

A vertical active period VA may refer to the number of pixel data displayed on one of vertical lines of the display panel 210.

A vertical blanking period VB may refer to a value obtained by converting a period, in which no pixel data is displayed, between the vertical active periods VA, included in each of adjacent frames, into the number of pixels.

Meanwhile, the pixel clock frequency may be calculated based on the horizontal active period HA, the horizontal blanking period HB, the vertical active period VA, the vertical blanking period VB, and the screen refresh rate. For example, the pixel clock frequency Dclk may be a value obtained by multiplying a total horizontal period Htotal, which is a sum of the horizontal active period HA and the horizontal blanking period HB, by a total vertical period Vtotal, which is a sum of the vertical active period VA and the vertical blanking period VB, and by the screen refresh rate Fv.

$$Dclk = Htotal \times Vtotal \times Fv \quad \text{[Equation 1]}$$

Figure 8A:
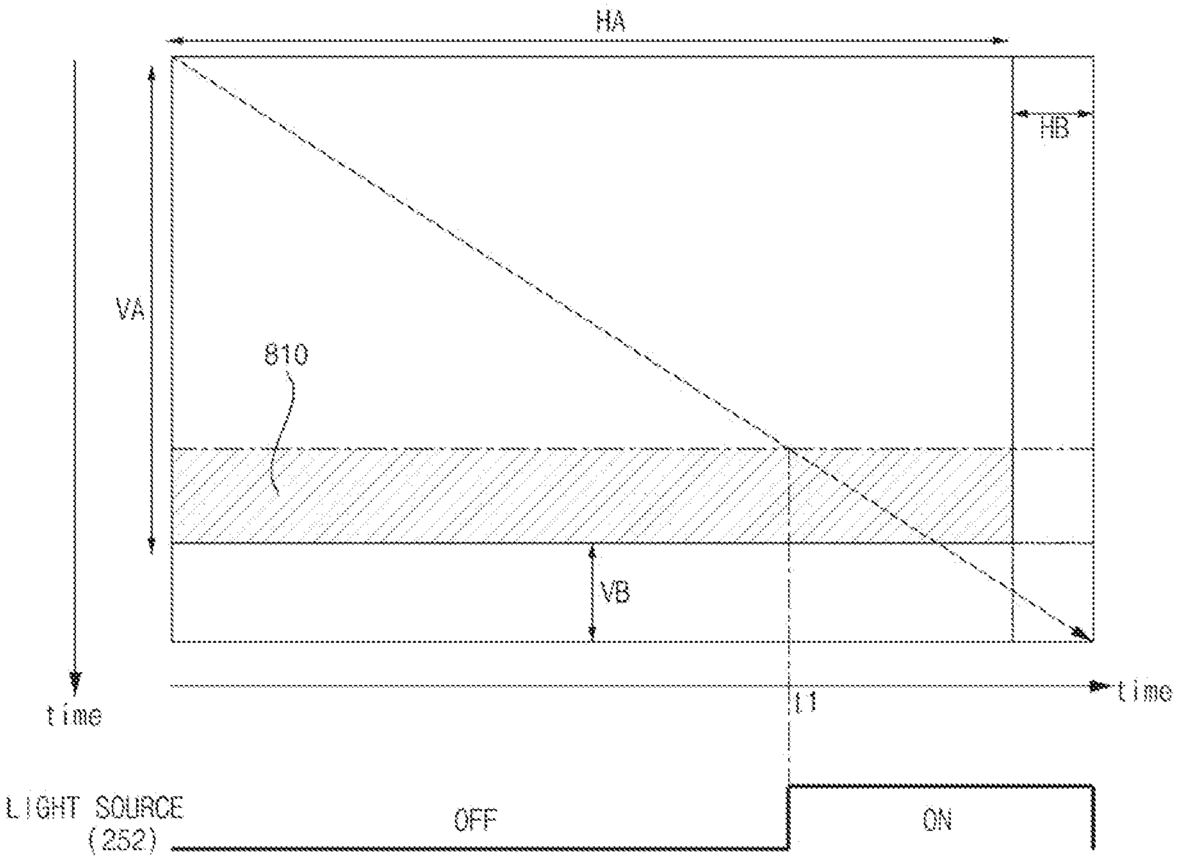

Referring to FIG. 8A, the light source 252 may be turned on/off in response to a PWM dimming signal having a predetermined duty ratio.

In this case, as the screen refresh rate increases, for example, as the screen refresh increases from 60 Hz to 120 Hz, a time corresponding to one frame may decrease from 16.67 ms to 8.33 ms. As described above, as the screen refresh rate increases, the time corresponding to one frame decreases, such that driving elements corresponding to pixels in a partial area 810 of the display panel 210 may not be activated at a time t1 when the light source 252 is turned on in response to the PWM dimming signal having the predetermined duty ratio.

When the driving elements corresponding to the pixels in the partial area 810 are not activated at the time t1 when the light source 252 is turned on, luminance difference and gradation unbalance may occur between the partial area 810 and other areas except the partial area 810. In addition, the driving elements included in the partial area 810 are sequentially driven in the order of the horizontal lines after the light source 252 is turned on, such that luminance difference and gradation unbalance may occur even between the horizontal lines included in the partial area 810.

Figure 8B:
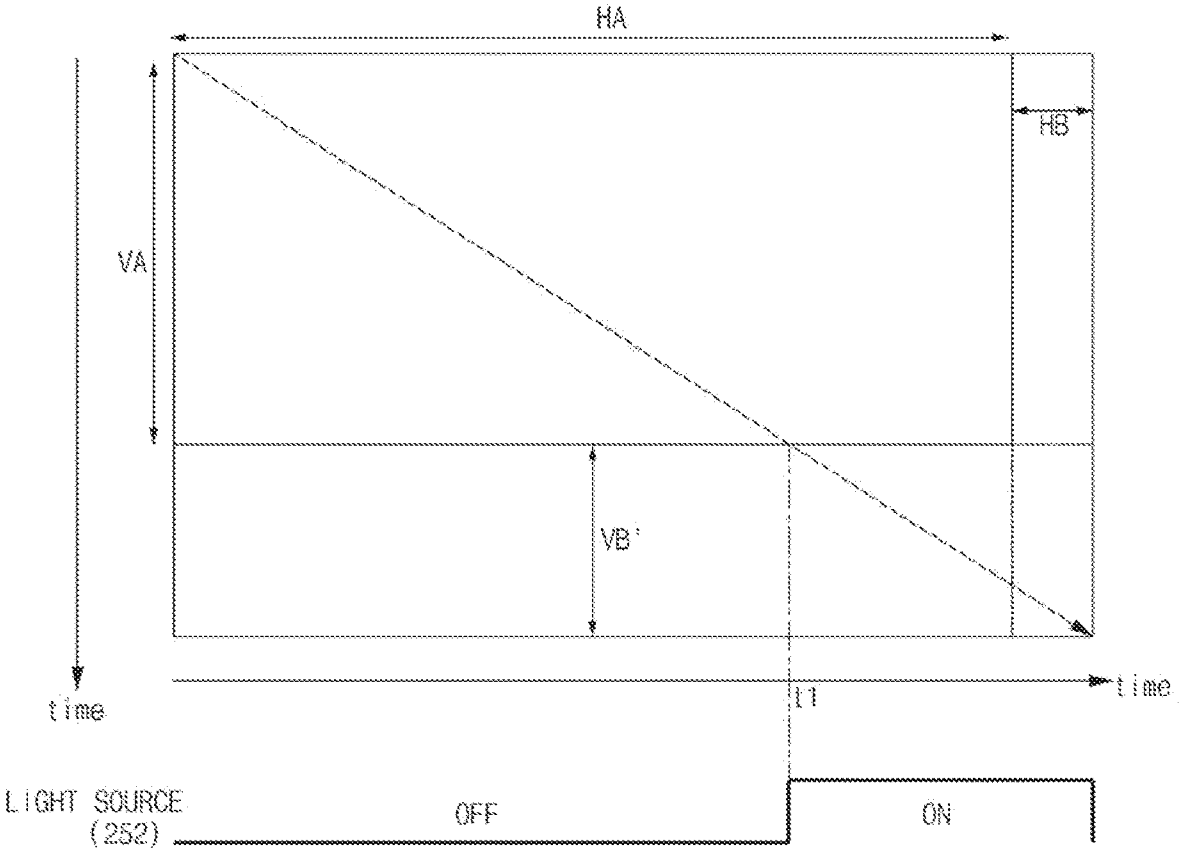

Meanwhile, referring to FIG. 8B, if the screen refresh rate is higher than or equal to the predetermined second reference refresh rate, for example, if the screen refresh rate is determined to be 120 Hz, the image display device 100 may determine a vertical blanking period VB' according to the screen refresh rate, so that a proportion of the vertical blanking period VB' in the total vertical period increases.

In this case, only the vertical blanking period VB' may increase while the vertical active period VA remains constant. Further, a ratio between the horizontal active period HA and the horizontal blanking period HB may remain constant.

Meanwhile, the vertical blanking period VB' may be determined so that a proportion of the vertical blanking period VB' in the total vertical period Vtotal may be greater than or equal to a proportion of the on-time of the light source 252 during which the light source 252 of the backlight unit 250 is turned on at a duty ratio.

For example, in the case where the horizontal/vertical resolution is 2560×1440, the horizontal blanking period HB is 160, and the proportion of the on-time of the light source 252, during which the light source 252 of the backlight unit 250 is turned on at a duty ratio, is 33%, if the screen refresh rate is determined to be 120 Hz, the vertical blanking period VB' may be determined to be greater than or equal to 720, and the pixel clock frequency may be calculated to be greater than or equal to 705 MHz.

Referring back to FIG. 5, in operation S580, the image display device 100 may control the operation of the driving elements, arranged on the display panel 210, according to the pixel clock frequency, to control output of an image through the display 180.

Figure 9A:
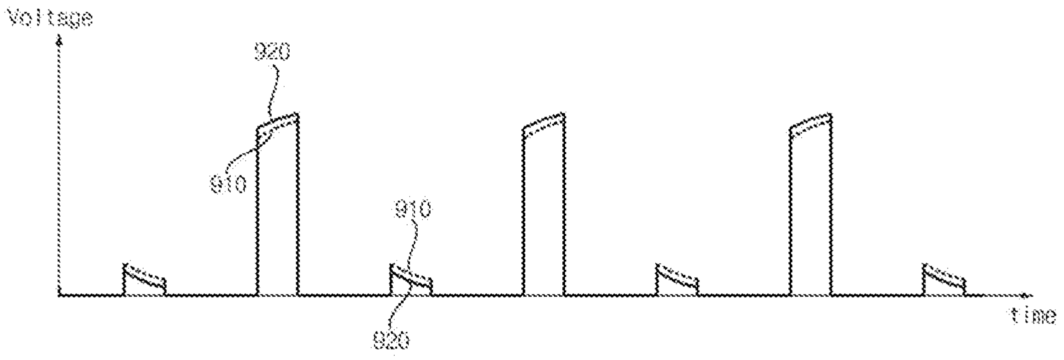
Figure 9B:
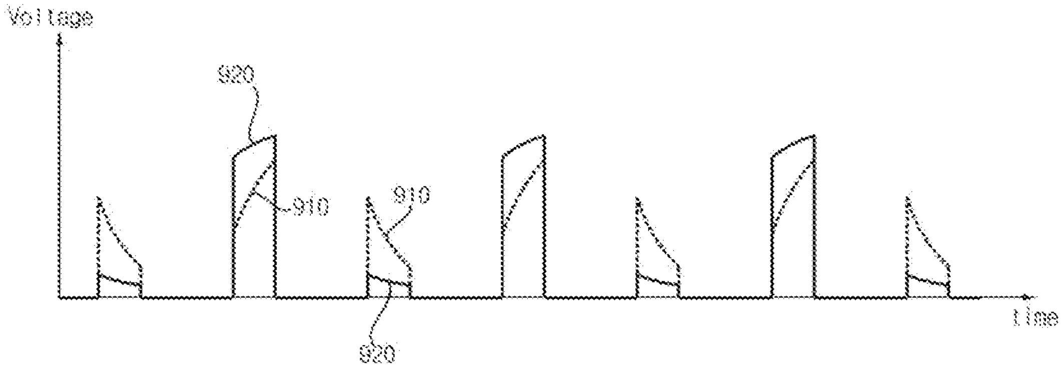

FIGS. 9A and 9B are graphs of voltages, corresponding to luminance values at a left upper end and a right lower end of the display panel 210, with respect to a change in vertical blanking periods VB and VB', in the case where the screen refresh rate is set to be higher than or equal to the second reference refresh rate, and white and black frames are alternately output to the display panel 210. In this case, the voltages corresponding to luminance values may be detected by an external sensor module (not shown) disposed opposite a front surface of the display panel 210.

Referring to FIG. 9A, it can be confirmed that, at the left upper end of the display panel 210, a graph 910, showing that a proportion of the vertical blanking period in the total vertical period Vtotal is constant (VB of FIG. 8A), is similar to a graph 920 showing that a proportion of the vertical blanking period increases with the screen refresh rate (VB' of FIG. 8B).

That is, the driving elements, which are arranged corresponding to pixels at the left upper end of the display panel 210, are already activated before the light source 252 is turned on at the duty ratio even when the screen refresh rate is greater than or equal to the second reference refresh rate, such that the arrangement of liquid crystal molecules has been completed to a predetermined level or more, and a high luminance may be detected at the left upper end of the display panel 210.

Meanwhile, referring to FIG. 9B, it can be confirmed that, at the right lower end of the display panel 210, there is a large difference between the graph 910, showing that a proportion of the vertical blanking period in the total vertical period Vtotal is constant (VB of FIG. 8A), and the graph 920 showing that a proportion of the vertical blanking period increases with the screen refresh rate (VB' of FIG. 8B).

That is, in the case of controlling operation of the driving elements arranged on the display panel 210 according to a high pixel clock frequency by increasing a proportion of the vertical blanking period in the total vertical period Vtotal according to the screen refresh rate, the liquid crystal molecules are arranged before a time when the light source 252 is turned on, such that a high luminance may be detected at the right lower end of the display panel 210 at the time when the light source 252 is turned on.

By contrast, in the case of controlling operation of the driving elements arranged on the display panel 210 according to a predetermined pixel clock frequency by maintaining a constant proportion of the vertical blanking period in the total vertical period Vtotal even when the screen refresh rate is greater than or equal to the second reference refresh rate, a voltage is applied to the liquid crystal at or after the time when the light source 252 is turned on, such that a very low luminance may be detected at the right lower end of the display panel 210 at the time when the light source 252 is turned on.

As described above, according to various embodiments of the present disclosure, by determining the vertical blanking period and the pixel clock frequency for each of the frames, included in an image, in response to a change in screen refresh rate, it is possible to control the operation of the driving elements, arranged corresponding to the pixels of the display panel 210, before light is emitted to the display panel 210 even when a screen refresh rate of the image display device 100 is set to a high level greater than or equal to a predetermined level, thereby preventing luminance difference and gradation unbalance between the horizontal lines on the display panel 210.

The accompanying drawings are merely used to help easily understand embodiments of the present disclosure, and it should be understood that the technical features presented herein are not limited by the accompanying drawings. As such, the present disclosure should be construed to extend to any alterations, equivalents and substitutes in addition to those which are particularly set out in the accompanying drawings.

The image display device and the method of operating the same of the present disclosure may be implemented as code that can be written to a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disk, an optical data storage, and a carrier wave, e.g., data transmission over the Internet. Furthermore, the processor-readable recording medium can be distributed over a plurality of computer systems connected to a network so that processor-readable code is written thereto and executed therefrom in a decentralized manner.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

The invention claimed is:

1. An image display device comprising:

a display panel including a plurality of pixels;

a backlight unit configured to emit light to the display panel; and a controller, wherein the controller is configured to:

determine a screen refresh rate for an image output through the display panel;

determine a vertical blanking period for each frame in the image in response to the determined refresh rate;

calculate a pixel clock frequency corresponding to the determined vertical blanking period; and control operation of a plurality of driving elements based on the calculated pixel clock frequency, the plurality of driving elements being arranged corresponding to each of the plurality of pixels and disposed on the display panel, wherein, when the screen refresh rate increases, a proportion of the vertical blanking period in a total vertical period of the each frame increases in response to an increase in the screen refresh rate.

2. The image display device of claim 1, wherein the controller determines the proportion of the vertical blanking period in the total vertical period to be higher than or equal to a proportion of an on-time of the backlight unit, during which the backlight unit is turned on at a duty ratio.

3. The image display device of claim 2, wherein the controller determines a horizontal blanking period so that a proportion of the horizontal blanking period in a total horizontal period of the each frame is constant even when the screen refresh rate changes.

4. The image display device of claim 3, wherein:

when the screen refresh rate is less than a reference refresh rate, the controller determines the vertical blanking period, so that the proportion of the vertical blanking period in the total vertical period is constant even when the screen refresh rate changes; and when the screen refresh rate is greater than the reference refresh rate, the controller determines the vertical blanking period, so that the proportion of the vertical blanking period in the total vertical period increases in response to the increase in the screen refresh rate.

5. The image display device of claim 4, wherein:

when the screen refresh rate is less than the reference refresh rate, the image display device displays an image on the display panel by driving a light source in response to an analog dimming signal, and when the screen refresh rate is higher than or equal to the reference refresh rate, the image display device drives the light source in response to a pulse width modulation (PWM) dimming signal.

6. The image display device of claim 3, wherein the pixel clock frequency is calculated based on a horizontal active period (HA), the horizontal blanking period (HB), a vertical active period (VA), the vertical blanking period (VB), and the screen refresh rate (Fv).

7. The image display device of claim 6, wherein the pixel clock frequency is a value obtained by multiplying a total horizontal period (Htotal) by a total vertical period (Vtotal), and by the screen refresh rate (Fv), wherein the total horizontal period (Htotal) is a sum of the horizontal active period (HA) and the horizontal blanking period (HB), and wherein the total vertical period (Vtotal) is a sum of the vertical active period (VA) and the vertical blanking period (VB).

8. The image display device of claim 6, wherein a ratio between the horizontal active period (HA) and the horizontal blanking period (HB) remains constant.

9. The image display device of claim 4, wherein, when the screen refresh rate is higher than or equal to the reference refresh rate, the vertical blanking period (VA) increases while a vertical active period (VA) remains constant.

* * * * *